United States Patent [19]

Rochat et al.

[11] 3,928,314

[45] Dec. 23, 1975

[54] ONE STEP PROCESS OF PREPARING AZO DYES BY SIMULTANEOUS DIAZOTIZATION AND COUPLING AT LOW PH

[75] Inventors: Alain Claude Rochat, Birsfelden, Switzerland; Emil Stocker, deceased, late of Riehen, Switzerland, by Heidi Stocker-Boller, legal representative

[73] Assignee: Ciba-Geigy AG, Basel, Switzerland

[22] Filed: May 18, 1973

[21] Appl. No.: 361,841

Related U.S. Application Data

[63] Continuation of Ser. No. 92,882, Nov. 25, 1970, abandoned.

[30] Foreign Application Priority Data

Nov. 27, 1969 Switzerland.................... 17614/69

[52] U.S. Cl............. 260/203; 260/144 P; 260/152; 260/154; 260/157; 260/158; 260/169; 260/176; 260/180; 260/181; 260/182; 260/204

[51] Int. Cl.²................... C09B 29/00; C09B 41/00

[58] Field of Search.......... 260/144, 203, 204, 152, 260/154, 158, 157, 176, 169, 180, 181, 182

[56] References Cited

UNITED STATES PATENTS

| | | | |
|---|---|---|---|
| 2,418,416 | 4/1947 | Locke | 260/195 |
| 2,478,767 | 8/1949 | Lock | 260/144 |
| 2,478,768 | 8/1949 | Locke | 260/144 |
| 3,325,470 | 6/1967 | Ribka | 260/193 |
| 3,332,932 | 7/1967 | De Lucia et al. | 260/204 |
| 3,336,288 | 8/1967 | Stocker et al. | 260/203 |
| 3,352,845 | 11/1967 | Armento | 260/152 |
| 3,382,228 | 5/1968 | Ferrari et al. | 260/158 |
| 3,402,168 | 9/1968 | Ronco et al. | 260/204 |
| 3,793,305 | 2/1974 | Balon et al. | 260/154 |

FOREIGN PATENTS OR APPLICATIONS

| | | | |
|---|---|---|---|
| 575,832 | 12/1930 | Germany | 260/141 |
| 1,180,375 | 10/1964 | Germany | 260/169 |

OTHER PUBLICATIONS

Houben–Weyl, "Methoden Der Organischen Chemie," Vol. 10/3, pp. 28 to 32 (1965).

Saunders, "The Aromatic Diazo–Compounds and Their Technical Applications," pp. 15 and 16 (1936).

Kozlov, et al., Chemical Abstracts, Vol. 56, pp. 2359 and 2360 (1962).

Belov, et al., Chemical Abstracts, Vol. 58, 12706 and 12707 (1963).

*Primary Examiner*—Floyd D. Higel
*Attorney, Agent, or Firm*—Wenderoth, Lind & Ponack

[57] ABSTRACT

Metal-free azo compounds are produced by the addition of an ester of nitrous acid to a mixture of a diazotisable amine, a coupling component, an organic acid and an organic solvent. The compounds produced are azo pigments or intermediates therefor.

13 Claims, No Drawings

ONE STEP PROCESS OF PREPARING AZO DYES BY SIMULTANEOUS DIAZOTIZATION AND COUPLING AT LOW PH

This is a continuation of application Ser. No. 92,882, filed Nov. 25, 1970, now abandoned.

DETAILED DESCRIPTION

The invention relates to a new process for the production of metal-free azo compounds containing no sulphonic acid groups, such as azo pigments or intermediate products therefore, in non-aqueous medium.

The difficulties arising with regard to yield and purity, or with regard to shade and constant quality, of azo pigments of higher molecular weights when, in the case of the normal aqueous coupling of diazo compounds without water-solubilising sulphonic acid groups, azo components are used which likewise contain no water-solubilising sulphonic acid groups, are known and can scarcely be avoided. In these cases, use is sometimes made of wetting and dispersing agents, as well as protective colloids, as auxiliaries in the reaction mixture. These measures are, however, often technically unsatisfactory. It is thus scarcely possible, using these conventional methods, to combine diazo compounds without solubilising sulphonic acid groups with twice coupling azo components without solubilising sulphonic acid groups, to form homogeneous, twofold coupling products. It has already been suggested that all these difficulties may be avoided by the coupling being performed in aqueous medium, in a concentrated reaction mixture, and with intensive mechanical stirring; and, optionally, the obtained pigments being conditioned by means of a heat treatment with high-boiling organic solvents. It is absolutely essential in this process for the diazo compounds to be produced in a special operation. The diazo compounds have to be thereby isolated in the form of their naphthalenemono- and disulphonic acid salts, or as zinc chloride double salts, and then generally also mixed with inorganic, water-binding salts. Such a procedure is laborious and time-consuming.

It has further been suggested that pure and deeply coloured metal-free azo pigments may be produced in good yield from diazotisable amines and coupling components free of sulphonic acid groups, by diazotising and coupling in organic solvents and in a concentrated reaction mixture, optionally with heat treatment of the obtained azo pigments in high-boiling solvents, in a single operation and hence economically favourably, by performing the diazotising without isolation of the diazo compound in an organic agent, and the coupling in a heterogeneous phase, in such a manner that the diazo and/or the coupling components are present in organic suspension, whereby the organic solvents contain at most 10% of water.

It has now been found that even better yields are obtained, with the reaction being performed in a shorter period of time, if an ester of nitrous acid is added, at a temperature between −50°C and +100°C, to a reaction mixture consisting of a diazotisable amino-benzene, a coupling component, an organic acid having a $pK_a$-value smaller than 3.0 and in an amount less than 1 mole relative to 1 mole of the amine, and an organic, non-water-soluble solvent having a dielectric constant smaller than 15, or a mixture of such solvents.

The process according to the invention renders unnecessary stabilisation, isolation, and drying of the diazo compound. Diazotising, coupling and, optionally, also conditioning of the formed metal-free azo compound can surprisingly be performed in a single operation, without expensive intermediate isolation or intermediate drying. Diazotising and coupling are carried out practically simultaneously. The process according to the invention can be performed rationally and economically with the use of relatively cheap solvents which, for the most part, can be recovered.

Using the process according to the invention, it is possible to produce, in particular, such metal-free pigments containing no sulphonic acid groups, of which the molecular weight is at least 500, which contain at least two —CO—NH-groups in the molecule, and which, in the case of the usual couplings in aqueous medium, produce qualitatively inferior products. The metal-free azo pigments are, in the first place, those of the 2-hydroxynaphthalene-3-carboxylic acid arylamide series.

Listed below are some examples of diazo and tetraazo components and once and twice coupling components, which are suitable for the process according to the invention. The components are preferably chosen so that the formed metal-free azo pigment contains at least two —CO—NH-groups.

EXAMPLES OF DIAZO COMPONENTS 2,4- and 2,5-dichloroaniline,
2,4,5-trichloroaniline,
2-chloro-4-nitroaniline,
4-chloro-2-nitroaniline,
2-methoxy-4-nitroaniline,
4-methoxy-2-nitroaniline,
2-aminobenzoic acid methyl ester,
aminoterephthalic acid dimethyl ester and -diethyl ester,
4-methoxy-3-aminophenylbenzylsulphone,
4-methyl-3-aminodiphenylsulphone,
4-methoxy-3-aminobenzensulphonic acid diethylamine,
2-methoxy-5-methyl-4-aminobenzenesulphonic acid methylamide,
2,5-dimethoxy-4-aminobenzenesulphonic acid anilide,
2,5-dimethoxy- and 2,5-diethoxy-4-benzoylaminoaniline,
2-methoxy-5-methyl-4-benzoylaminoaniline,
4-ethoxy-3-aminobenzamide,
4-methoxy-3-aminobenzoic acid anilide,
4-methyl-3-aminobenzoic acid-2',4'-dimethylanilide,
4-methyl-3-aminobenzoic acid-4'-chloroanilide,
4-chloro-3-aminobenzoic acid-2'-methyl-5'-chloroanilide,
4-chloro-3-aminobenzoic acid-2',4'- and -2',5'-dichloroanilide,
4-chloro-3-aminobenzoic acid-2',4',5'-trichloroanilide,
4-chloro-3-aminobenzoic acid-2'-methyl-3'-chloroanilide,
4-carboethoxy-3-aminobenzoic acid-2',5'-dichloroanilide,
4-chloro-3-aminobenzoic acid,
4-methoxy-3-aminobenzoic acid,
4-methyl-3-aminobenzoic acid.

EXAMPLES OF TETRAZO COMPONENTS 3,3'-dichlorobenzidine,
2,5,2',5'-tetrachlorobenzidine,
3,3'-dimethoxybenzidine, 3,3'-dimethylbenzidine.

EXAMPLES OF ONCE COUPLING COMPONENTS 2-hydroxynaphthalene-3-carboxylic acid anilide, -4'-chloroanilide, -3'-nitroanilide, -2'-methoxyanilide, -2'-methylanilide, -2',3'-dimethylanilide, 2',4'-dimethylanilide, -2',4'-dimethoxy-5'-chloroanilide, -2',5'-dimethoxy-4'-chloroanilide, -2'-methyl-4'-chloroanilide, -2'-methyl-4'-methoxyanilide, -1'-naphthylamide and -2'-naphthylamide, 2-hydroxycarbazole-3-carboxylic acid-4'-chloroanilide, 6-(2',3'-hydroxynaphthoylamino)-2,4-dioxotetrahydroquinazoline, 5-(2',3'-hydroxynaphthoylamino)-benzimidazolone-(2), 1-(2',3'-hydroxynaphthoylamino)-2-methoxy-5-chloro-4-benzoylaminobenzene, 3-(2',3'-hydroxynaphthoylamino)-4-chlorobenzoic acid-2'',5''-dichloroanilide, acetoacetic acid anilide, -2-chloroanilide, -2-methoxyanilide, -2,4-dimethylanilide, -2,5-dimethoxy-4-chloroanilide, 5-acetoacetylaminobenzimidazolone(-2),
2-hydroxynaphthalene-3-carboxylic acid,
2-hydroxycarbazole-3-carboxylic acid.

EXAMPLES OF TWICE COUPLING COMPONENTS

Bis-(2',3'-hydroxynaphthoyl)-1,4-diaminobenzene, -1,4-diamino-2-chlorobenzene, -1,4-diamino-2-methyl-5-chlorobenzene, -benzidine, -o-tolidine, -1,4-diamino-2,5-dimethoxybenzene, -1,4-diamino-2,5-dimethylbenzene, -1,4-diamino-2,5-dichlorobenzene, -1,4-diamino-2-methoxy-5-chlorobenzene, -4,4'-diaminodiphenyl ether.

Bis-(acetoacetyl)-benzidine, -o-tolidine, -1,4-diamino-2,5-dichlorobenzene, -1,4-diamino-2-methyl-5-chlorobenzene, terephthaloylbisacetic acid-di-(o-chlorophenylamide).

Solvents to be used according to the invention having a dielectric constant smaller than 15, i.e. weakly polar to nonpolar solvents, are preferably aliphatic and aromatic halogenated hydrocarbons, e.g. methylene chloride, chloroform, 1,1-dichloroethane, 1,2-dichloroethane, 1,1,1-trichloroethane, 1,1,2-trichloroethane, 1,1,2,2-tetrachloroethane, 1,2-dichloropropane, 1,3-dichloropropane, chlorobenzene, o-dichlorobenzene, 1,2,4-trichlorobenzene, or mixtures thereof. The mixtures preferred are those consisting of a low-boiling solvent having a boiling-point below 90°C, and a high-boiling solvent having a boiling point above 130°C; such as mixtures of 1,1,1-trichloroethane and chlorobenzene, or 1,2-dichloroethane and o-dichlorobenzene, or chloroform and 1,2,4-trichloroethane. Further suitable solvents are aliphatic or aromatic hydrocarbons such as benzene, toluene, xylene, tetraline and decaline, also petroleum fractions, ethers and ketones such as, e.g. methylisobutyl ketone.

Used as diazotising agents are nitrous acid esters, especially of primary or secondary alcohols having 1 to 10 carbon atoms. Examples of such esters are the liquid nitrites of butyl, pentyl, isopentyl, heptyl, and decyl alcohol, as well as benzyl alcohol, having a boiling point above 50°C; the esters are advantageously used with alcohols containing 1 to 3 carbon atoms, i.e. the methyl, ethyl, propyl or isopropyl ester, which have a boiling point below 50°C, and are gaseous, or very readily volatile liquids. The esters may be added to the reaction mixture in liquid form, or dissolved in a solvent, e.g. in the same one in which the reaction is performed. The low-boiling esters can also be introduced in the gaseous state.

As the organic acid with a $pK_a$-value smaller than 3.0, α-halogenated alkanoic acids having 2 to 6 carbon atoms are preferably used, such as α-chloroacetic acid, α-chloropropionic acid, α-chlorobutyric acid, α-chloroisovaleric acid, and the corresponding bromine-containing acids. It is advantageous to use α-polyhalogenated acids having 2 to 6 carbon atoms, such as di- and trichloroacetic acid, trifluoroacetic acid and perfluorobutyric acid. The amount of acid to be used is smaller than 1 mole per mole of amine; it is usually 0.05 to 0.5 mole, preferably 0.1 to 0.4 mole.

The optimum amount of catalyst is different, however, for each acid, and depends greatly on the dissociation constant of the latter. Very strong acids, such as perfluorobutyric acid ($pK_a$-value smaller than 1.0), act in quite small amounts (0.05 to 0.2 moles per mole of amine used). Weaker carboxylic acids, such as α-bromocaproic acid or α-chloroacetic acid, have to be used in larger amounts (0.2 to 0.5 mole per mole of amine used).

The reaction temperature is usually between 0° and 60°C, advantageously between 20° and 50°C.

The reaction can be performed in a homogeneous or heterogeneous phase. A homogeneous phase obtains where the constituents of the reaction mixture are sufficiently soluble in the applied solvent.

On account of practically simultaneous diazotisation and coupling, catalytically accelerated by the acid, the reaction proceeds very rapidly. The azo compound, which is obtained in excellent yield, is advantageously isolated after removal of excess nitrite and of the water formed during the reaction, e.g. by distillation, by centrifuging, or filtration and washing with an organic solvent. Since the isolated azo compound contains no inorganic salts, an additional washing out with water, or with special solvents suitable for salt removal, is not necessary.

Optionally, the pigment preparation according to the invention, i.e. diazotisation and coupling in organic solvent without intermediate isolation of the diazotising components, is followed by a heat treatment. This heat treatment may take place in the same solvent or solvent mixture in which diazotisation and coupling have been performed; the solvent can, however, also be changed. Such a heat treatment is generally carried out at temperatures of above 70°C, mostly between 80° and 180°C. A heat treatment or conditioning of the pigments is performed particularly in the case where it is required to increase the fastness to migration in PVC of the pigments according to the invention.

A further advantageous embodiment of the process consists in the pigment produced according to the invention, and which is contained in the solvent generally to the extent of about 5%, not, or only partially, being liberated, after filtration and washing, from the organic solvents. After the pigment has been filtered off, the respective solvent still remaining in the pigment can be wholly or partly replaced or made up by another solvent. It is also possible to add to these pigment pastes obtained according to the invention organic polymers such as, e.g. PVC, cellulose acetate, cellulose butyrate, or resins. This addition is dependent on the intended application, and on the specific solvent used or subsequently added.

In this manner are obtained solvent-containing pigment pastes which contain the pigment in very fine dispersion, and which are suitable for the direct pigmenting of organic polymeric material such as, e.g. lacquers or synthetic materials.

The pigments produced according to the invention can be used, in inorganic or organic media, for the dyeing or pigmenting of paper in the pulp or in the coating, of lacquers, synthetic materials such as, e.g. polyvinyl chloride, polyurethane, polypropylene or polyethylene, cellulose esters, spinning masses, sheets, or for the pigment printing of textiles.

With regard to the intermediate products (for pigments) produced according to the invention, these are, e.g. azo compounds with carboxy groups, which, for pigment formation, still have to be converted with aliphatic or aromatic amines into the corresponding amides or anilides.

The temperatures are given in degrees Centigrade in the following examples.

EXAMPLE 1

An amount of 17.7 g of 4-chloro-3-aminobenzoic acid-2',4',5'-trichloroanilide and 15.8 g of 2-hydroxynaphthalene-3-carboxylic acid-1'-naphthylamide is suspended in 600 ml of 1,1,1-trichloroethane. After the addition of 1.22 g of trichloroacetic acid, the mixture is refluxed for 30 minutes. The fine suspension is cooled to 25° – 30° and, with vigorous stirring, 3.5 g of freshly prepared gaseous methyl nitrite are fed in under the surface during the course of 15 minutes. The temperature is maintained at 25° to 30°. A control test is made 15 minutes after the end of the feeding-in operation, in order to verify whether the reaction mixture contains free nitrite; if this is not the case, further amounts of methyl nitrite are fed in until the nitrite test is positive. The mixture is thereupon heated to 40°, and is allowed to react fully for one hour whilst being vigorously stirred. It is then heated to 70° – 80°, and 50 ml of solvent are distilled off. After slight cooling, the red suspension is filtered, the moist pigment washed with 200 ml of warm 1,1,1-trichloroethane, and dried under vacuum at 90° – 100°. The yield is 32.4 g, i.e. 96% of the theoretical value.

The pigment has good fastness to migration in soft-polyvinyl chloride, and a very good fastness to crosslacquering.

An equally good pigment with the same yield is obtained by replacing the 1.22 g of trichloroacetic acid by 0.87 g of trifluoroacetic acid.

If, instead of using 1,1,1-trichloroethane as solvent, 1,2-dichloroethane, chlorobenzene, o-dichlorobenzene, 1,2,4-trichlorobenzene, or mixtures thereof, are used, then equally good pigments are obtained in yields between 86 and 90% of the theoretical value.

EXAMPLE 2

An amount of 29.3 g of 2-hydroxynaphthalene-3-carboxylic acid-2',4'-dimethylanilide and 31.8 g of 4-chloro-3-aminobenzoic acid-2',4'-dichloroanilide is suspended in 450 ml of chlorobenzene; the mixture is then refluxed (ca. 130°) for 30 minutes, whereby a clear solution is obtained. After cooling to 30°, 3.8 g of chloroacetic acid are added and, in the course of 30 minutes, 7.0 g of freshly prepared gaseous methyl nitrite are fed in below the surface, whereby the temperature is maintained at 25° – 30°. Vigorous stirring is necessary for the immediate reaction of the nitrite. When 15 minutes have elapsed after the end of the feeding-in operation, a control test is carried out to determine whether an excess of methyl nitrite is present. If that is shown not to be the case, further amounts of nitrite are introduced below the surface until a small excess can be detected. The red suspension is then heated to 40°, and is allowed to react fully, whilst being well stirred, during 1 hour. The whole mixture is finally heated to 130°; ca. 50 ml of solvent are then distilled off, the mixture is cooled to 110°, well filtered under suction, and the moist pigment washed out portionwise with altogether 250 ml of hot chlorobenzene. Drying is performed in vacuo at 90° – 100°. The yield is 59 g, i.e. 95.5% of the theoretical value.

The pigment has good fastness to migration in soft-polyvinyl chloride, and very good fastness to crosslacquering in lacquers.

If the 3.8 g of chloroacetic acid are replaced by 2.6 g of α-dichloroacetic acid, or by 2.14 g of perfluorobutyric acid, or by 9.75 g of α-bromocaproic acid, the procedure being otherwise as described in Example 2, then the same product is obtained in approximately equal yield and purity.

EXAMPLE 3

An amount of 19 g of 2-hydroxynaphthalene-3-carboxylic acid and 17.5 g of 4-chloro-3-aminobenzoic acid is dissolved in 700 ml of xylene at 130°. This solution is cooled to 45°, whereby the greatest part of the starting materials precipitates; 2.45 g of trichloroacetic acid are then added, and a start is immediately made with the addition of ca. 12.3 g of freshly distilled isopentyl nitrite. During the 20 minutes in which the nitrite is being added dropwise, the temperature is maintained continually at 45°. A control test is carried out 30 minutes after completion of the addition, in order to establish whether an excess of nitrite is present. If this proves not to be the case, the addition of isopentylnitrite is continued until a slight nitrite excess is detectable.

The red suspension is then stirred for 1 hour at 50° and for 1 hour at 60°. About 100 ml of solvent are thereupon distilled off in vacuo at 80°; the suspension is cooled to 50°, filtered, and the moist pigment-intermediate-product washed first with 100 ml of warm xylene, and subsequently with 100 ml of warm cyclohexane. The product is dried at 80° in vacuo. The yield is 35 g, i.e. 94.5% of the theoretical value.

In practice the intermediate product is not isolated but converted direct into the desired pigment by transformation of the two carboxyl groups into carboxylic acid arylides.

This reaction can also be performed in the homogeneous phase, e.g. by replacement of the xylene by methylisobutyl ketone. In this case the starting materials remain in solution when a start is made with the addition of the nitrite.

EXAMPLE 4

In a mixture of 450 ml of methylisobutyl ketone and 250 ml of 1,1,1-trichloroethane are suspended 32 g of 2-hydroxynaphthalene-3-carboxylic acid-1'-naphthylamide and 17.5 g of 4-chloro-3-aminobenzoic acid. To the suspension are then added dropwise within 30 minutes at 25°–30°, with good stirring, 12.3 g of freshly distilled isopentyl nitrite. After completion of this addition, the mixture is allowed to subsequently react for 30 minutes at 30°; a test is then carried out to determine whether a slight nitrite excess is present (if not, more isopentyl nitrite is introduced until a slight nitrite excess exists); the mixture is then heated to 40°, and stirring proceeds for 1 hour at 40°.

The bulk of 1,1,1-trichloroethane is then distilled off azeotropically by the uniform heating of the reaction mixture to ca. 110°; the suspension is boiled at this temperature for 30 minutes, cooled to 30°, well filtered under suction, and the moist pigment-intermediate-product washed with ca. 150 ml of methylisobutyl ketone. Drying is performed at 90° under vacuum. Thus obtained are 42 g of product, corresponding to a yield of 85% of the theoretical value. From this can be obtained, by conversion of this carboxylic acid into the desired carboxylic acid anilide, a valuable pigment. It is even possible in most cases to dispense with the isolation of the intermediate product, and to carry out the whole synthesis of the pigments (consisting, for example, of 4 stages: diazotisation/coupling/acid chloride formation/acid anilide formation) in one vessel.

Instead of isopentyl nitrite, it is possible to use, without noticeable change in yield or in quality, methyl, ethyl, isopropyl, n-butyl, or n-decyl nitrite.

What we claim is:

1. Process for the production of a metal-free azo compound containing no sulphonic acid groups by diazotisation and coupling in organic solvents, which consists essentially of adding a $C_1$ to $C_{10}$ alkyl nitrite at a temperature between −50°C and +100°C, to an anhydrous reaction mixture consisting of a diazotisable primary amino-benzene, a coupling component, a $C_2$ to $C_6$ α-halogenated alkanoic acid having a $pK_a$-value smaller than 3.0 in an amount of 0.05 to 0.5 moles of said acid relative to 1 mole of said amine, and an organic, non-water-soluble solvent having a dielectric constant smaller than 15, or a mixture of such solvents.

2. Process according to claim 1 wherein the diazotisable amine is 2,4-dichloroaniline
2,5-dichloroaniline,
2,4,5-trichloroaniline,
2-chloro-4-nitroaniline,
4-chloro-2nitroaniline,
2-methoxy-4-nitroaniline,
4-methoxy-2-nitroaniline,
2-aminobenzoic acid methyl ester,
aminoterephthalic acid dimethyl ester,
aminoterephthalic acid diethyl ester,
4-methoxy-3-aminophenylbenzylsulphone,
4-methyl-3-aminodiphenylsulphone,
4-methoxy-3-aminobenzenesulphonic acid diethylamine,
2-methoxy-5-methyl-4-aminobenzenesulphonic acid methylamide,
2,5-dimethoxy-4-aminobenzenesulphonic acid anilide,
2,5-dimethoxy-4-benzoylaminoaniline,
2,5-diethoxy-4-benzoylaminoaniline,
2-methoxy-5-methyl-4-benzoylaminoaniline,
4-ethoxy-3-aminobenzamide,
4-methoxy-3-aminobenzoic acid anilide,
4-methyl-3-aminobenzoic acid-2',4'-dimethylanilide,
4-methyl-3-aminobenzoic acid-4'-chloroanilide,
4-chloro-3-aminobenzoic acid-2'-methyl-5'-chloranilide,
4-chloro-3-aminobenzoic acid-2',4'-dichloroanilide,
4-chloro-3-aminobenzoic acid-2',5'-dichloranilide,
4-chloro-3-aminobenzoic acid-2',4',5'-trichloroanilide,
4-chloro-3-aminobenzoic acid-2'-methyl-3'-chloroanilide,
4-carboethoxy-3-aminobenzoic acid-2',5'-dichloroanilide,
4-chloro-3-aminobenzoic acid,
4-methoxy-3-aminobenzoic acid,
4-methyl-3-aminobenzoic acid,
3,3'-dichlorobenzidine,
2,5,2',5'-tetrachlorobenzidine,
3,3'-dimethoxybenzidine,
or
3,3'-dimethylbenzidine,
and the coupling component is
2-hydroxynaphthalene-3-carboxylic acid anilide,
2-hydroxynaphthalene-3-carboxylic acid-4'-chloranilide,
2-hydroxynaphthalene-3-carboxylic acid-3'-nitroanilide,
2-hydroxynaphthalene-3-carboxylic acid-2'-methoxyanilide,
2-hydroxynaphthalene-3-carboxylic acid-2'-methylanilide,
2-hydroxynaphthalene-3-carboxylic acid-2',3'-dimethylanilide,
2-hydroxynaphthalene-3-carboxylic acid-2',4'-dimethylanilide,
2-hydroxynaphthalene-3-carboxylic acid-2',4'-dimethoxy-5'-chloroanilide,
2-hydroxynaphthalene-3-carboxylic acid-2',5'-dimethoxy-4'-chloroanilide,
2-hydroxynaphthalene-3-carboxylic acid-2'-methyl-4'-chloroanilide,
2-hydroxynaphthalene-3-carboxylic acid-2'-methyl-4'-methoxyanilide,
2-hydroxynaphthalene-3-carboxylic acid-1'-naphthylamide,
2-hydroxynaphthalene-3-carboxylic acid-2'-naphthylamide,
2-hydroxycarbazole-3-carboxylic acid-4'-chloranilide,
6-(2',3'-hydroxynaphthoylamino)-2,4-dioxotetrahydroquinazoline,
5-(2',3'-hydroxynaphthoylamino)-benzimidazolone-(2),
1-(2',3'-hydroxynaphthoylamino)-2-methoxy-5-chloro-4-benzoyl-aminobenzene,
3-(2',3'-hydroxynaphthoylamino)-4-chlorobenzoic acid-2'',5''-dichloroanilide,
acetoacetic acid anilide,
acetoacetic-2-chloroanilide,
acetoacetic-2-methoxyanilide,
acetoacetic-2,4-dimethylanilide,
acetoacetic-2,5-diethoxy-4-chloroanilide,
5-acetoacetylaminobenzimidazolone(-2),
2-hydroxynaphthalene-3-carboxylic acid,
2-hydroxycarbazole-3-carboxylic acid
bis-(2',3'-hydroxynaphthoyl)-1,4-diaminobenzene,
bis-(2',3'-hydroxynaphthoyl)-1,4-diamino-2-chlorobenzene
bis-(2',3'-hydroxynaphthoyl)-1,4-diamino-2-methyl-5-chlorobenzene,
bis-(2',3'-hydroxynaphthoyl)-benzidine,
bis-(2',3'-hydroxynaphthoyl)-o-tolidine,
bis-(2',3'-hydroxynaphthoyl)-1,4-diamino-2,5-dimethoxybenzene,
bis-(2',3'-hydroxynaphthoyl)-1,4-diamino-2,5-dimethylbenzene, bis-(2',3'-hydroxynaphthoyl)-1,4-diamino-2,5-dichlorobenzene,
bis-(2',3'-hydroxynaphthoyl)-1,4-diamino-2-methoxy-5-chlorobenzene,
bis-(2',3'-hydroxynaphthoyl)-4,4'-diaminodiphenyl ether
bis-(acetoacetyl)-benzidine,
bis-(acetoacetyl)-o-tolidine,
bis-(acetoacetyl)-1,4-diamino-2,5-dichlorobenzene,
bis-(acetoacetyl)-1,4-diamino-2-methyl-5-chlorobenzene, or terephthaloylbisacetic acid-di-(o-chlorophenylamide).

3. Process according to claim 1 wherein the α-halogenated carboxylic acid, if having a $pK_a$ below 1.0 is employed in the amount of 0.05 to 2.0 moles per mole of amine or if having a higher $pK_a$, then in an amount of 0.2 to 0.5 moles per mole of amine.

4. Process according to claim 1, wherein the reaction is performed at a temperature of 20° to 50°C.

5. Process according to claim 1, wherein tri- or dichloroacetic acid is used.

6. Process according to claim 1, wherein monochloroacetic acid is used.

7. Process according to claim 1, wherein aliphatic or aromatic, hydrocarbons or halogenated aliphatic or aromatic hydrocarbons are used as organic solvents.

8. Process according to claim 1, wherein a mixture is used consisting of an organic solvent having a boiling point below 90°C and an organic solvent having a boiling point above 130°C.

9. Process according to claim 1, wherein nitrous acid esters of primary or secondary alcohols having 1 to 3 carbon atoms are used.

10. Process according to claim 1, wherein gaseous methyl nitrite is used as the alkyl nitrite.

11. Process according to claim 1 wherein the diazotisable amine is 4-chloro-3-aminobenzoic acid-2',4',5'-trichloroanilide; the coupling component is 2-hydroxynaphthalene-3-carboxylic acid-1'-napthylamide, the organic solvent is 1,1,1-trichloroethene, 1,2-dichloroethane, chlorobenzene, O-dichlorobenzene, 1,2,4-trichlorobenzene or mixtures thereof, the alkyl nitrite is methyl nitrite and the α-halogenated carboxylic acid is trichloroacetic acid or trifluoroacetic acid.

12. A process according to claim 1 wherein the coupling component is 2-hydroxynaphthalene-3-carboxylic acid -2',4'-dimethylanilide, the diazotisable amine is 4-chloro-3-aminobenzoic acid-2',4'-dichloroanilide, the alkyl nitrite is methyl nitrite, the solvent is chlorobenzene and the α-halogenated carboxylic acid is chloroacetic acid, dichloroacetic acid, perfluorobutyric acid or α-bromoaprioeacid.

13. A process according to claim 1 wherein the diazotisable amine is 4-chloro-3aminobenzoic acid, the coupling component 2-hydroxynaphthalene-3-carboxylic acid, the solvent is xylene or methyl isobutylketone, the alkyl nitrite is isopentyl nitrite and the α-halogenated carboxylic acid is trichloroacetic acid.

* * * * *